2,746,981

DISPROPORTIONATION OF ARYLDICHLOROSILANES

George H. Wagner, Clarence, and Margaret M. Burnham, Eggertsville, N. Y., assignors to Union Carbide and Carbon Corporation, a corporation of New York No Drawing. Application September 26, 1952, Serial No. 311,792

6 Claims. (Cl. 260—448.2)

This invention relates to the disproportionation of aryldichlorosilanes. More particularly, this invention relates to the disproportionation of a monoaryldichlorosilane whereby considerable amounts of the diaryldichlorosilane are produced.

The diaryldichlorosilanes have been found particularly useful in many syntheses, and therefore considerable attention has been directed toward their production. Heretofore these compounds were for the most part produced from side reactions occurring in the preparation of monoarylchlorosilanes by the Grignard method or by other known methods. Accordingly, it is desirable to have a process for the direct production of the diaryl compounds.

In accordance with the present invention, diaryldichlorosilanes are prepared by heating the monoaryldichlorosilane in the presence of a Friedel-Crafts type catalyst taken from the group consisting of aluminum or boron chloride. The amount of catalyst employed varies from 0.0001% to 5% by weight of the silane, although greater amounts may be employed. Such additional amounts, however, do not materially increase the yield. The catalysts have been found so effective that normally only from .0001% to 1% by weight is employed. When employing aluminum chloride as the disproportionating catalyst, it is only necessary to heat the mixture to a temperature of at least 50° C. In those instances where boron chloride is employed as a disproportionating catalyst, it is necessary to heat the mixture to a temperature of at least 100° C.

In the practice of our invention, a monoaryldichlorosilane for example, phenyldichlorosilane $C_6H_5SiHCl_2$, and aluminum or boron chloride are placed in a flask connected to a distillation column. The mixture is then heated for several hours. During this period dichlorosilane, $SiH_2Cl_2$ is evolved and may if desired, be caught in a Dry Ice trap attached to the vent end of the still. The product remaining in the flask is diphenyldichlorosilane, which may then be removed by distillation.

The reaction by which a monoaryldichlorosilane is disproportionated to produce a diaryldichlorosilane may be shown as follows, wherein the aryl radical is phenyl.

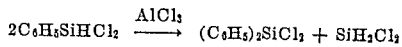

To illustrate the present invention, phenyldichlorosilane was disproportionated with aluminum and boron chloride and the product obtained was diphenyldichlorosilane. The examples below more fully disclose the above reactions.

Example I 122.8 grams of phenyldichlorosilane and 0.1 gram of $AlCl_3$ (approximately .08 weight percent) were placed in a flask connected to a column packed with glass helices. The reactants were refluxed for 7–8 hours at 185° C. during which period dichlorosilance $SiH_2Cl_2$ was evolved. A small amount of sodium chloride was added to kill the catalyst and diphenyldichlorosilane was then removed by distillation. The yield of diphenyldichlorosilane was 54.3 grams.

Example II 100 grams of phenyldichlorosilane and boron chloride in an amount of 0.0002 weight percent of the silane were placed in a flask connected to a column packed with glass helices. The reactants were heated for 7–8 hours at 185° C. during which period a small amount of dichlorosilane was evolved. A small amount of sodium chloride was added to kill the catalyst and 34.1 grams of diphenyldichlorosilane was removed by distillation.

Example III 123.5 grams of phenyldichlorosilane and 0.6 gram of $AlCl_3$ (approximately 0.5 weight percent) were placed in a flask connected to a column packed with glass helices. The reactants were heated to 50° C. for 24 hours during which period an amount of dichlorosilane $SiH_2Cl_2$ equivalent to 12 weight percent of the phenyldichlorosilane was evolved. The temperature was then raised to 65° C. for 24 hours during which period the remainder of the phenyldichlorosilane was disproportionated to dichlorosilane and diphenyldichlorosilane. A yield of 70 grams diphenyldichlorosilane was isolated from the crude by distillation.

Our invention may be employed to disproportionate any aryldichlorosilane into the corresponding diaryl compound, so long as there is an aryl group and one hydrogen atom attached to the silicon atom.

What is claimed is:

1. Process of disproportionating an aryldichlorosilane containing one aryl group and one hydrogen atom attached to silicon which comprises heating said silane in the absence of other reactants to a temperature of at least 50° C. and at a pressure not to exceed atmospheric in the presence of a Friedel-Crafts type catalyst taken from the class consisting of aluminum chloride and boron chloride, and recovering a diaryldichlorosilane.

2. Process of disproportionating phenyldichlorosilane which comprises heating said silane in the absence of other reactants to a temperature of at least 50° C. and at a pressure not to exceed atmospheric in the presence of a Friedel-Crafts type catalyst taken from the group consisting of aluminum chloride and boron chloride, and recovering diphenyldichlorosilane.

3. Process of disproportionating phenyldichlorosilane which comprises heating said silane in the absence of other reactants to a temperature of at least 50° C. and at a pressure not to exceed atmospheric in the presence of aluminum chloride and recovering diphenyldichlorosilane.

4. Process of disproportionating phenyldichlorosilane which comprises heating said silane in the absence of other reactants at a temperature of at least 50° C. and at a pressure not to exceed atmospheric in the presence of boron chloride and recovering diphenyldichlorosilane.

5. Process of disproportionating an aryldichlorosilane containing one aryl group and one hydrogen atom attached to silicon, which comprises heating said silane in the absence of other reactants to a temperature of at least 100° C. at atmospheric pressure in the presence of a Friedel-Crafts type catalyst taken from the class consisting of aluminum chloride and boron chloride, and recovering a diaryldichlorosilane.

6. Process of disproportionating an aryldichlorosilane containing one aryl group and one hydrogen atom attached to silicon which comprises heating said silane in the absence of other reactants to a temperature of at least 100° C. at subatmospheric pressure in the presence of a Friedel-Crafts type catalyst taken from the class consisting of aluminum chloride and boron chloride, and recovering a diaryldichlorosilane.

(References on following page)

References Cited in the file of this patent

UNITED STATES PATENTS

| | | |
|---|---|---|
| 2,572,302 | Barry | Oct. 23, 1951 |
| 2,626,267 | Barry | Jan. 20, 1953 |

FOREIGN PATENTS

| | | |
|---|---|---|
| 663,810 | Great Britain | Dec. 27, 1951 |

OTHER REFERENCES

Whitmore: Jour. Am. Chem. Soc., vol. 69 (1947), pp. 2108–2110.

Sauer: Jour. Am. Chem. Soc., vol. 70 (1948), pp. 3590–3596.

Calingaert: Jour. Am. Chem. Soc., vol. 61 (1939), pp. 2748–2754.